Oct. 28, 1924.
C. K. EDWARDS
TRANSPORT VEHICLE
Filed Nov. 9, 1923
1,513,381
2 Sheets-Sheet 1
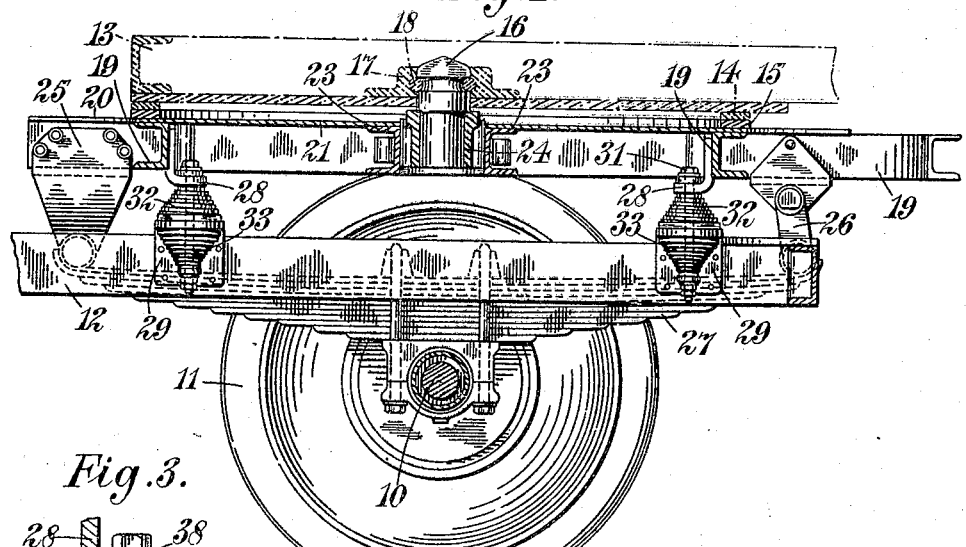
INVENTOR
Charles Kearns Edwards
By Byrns Stetson Parmelee
his Atty

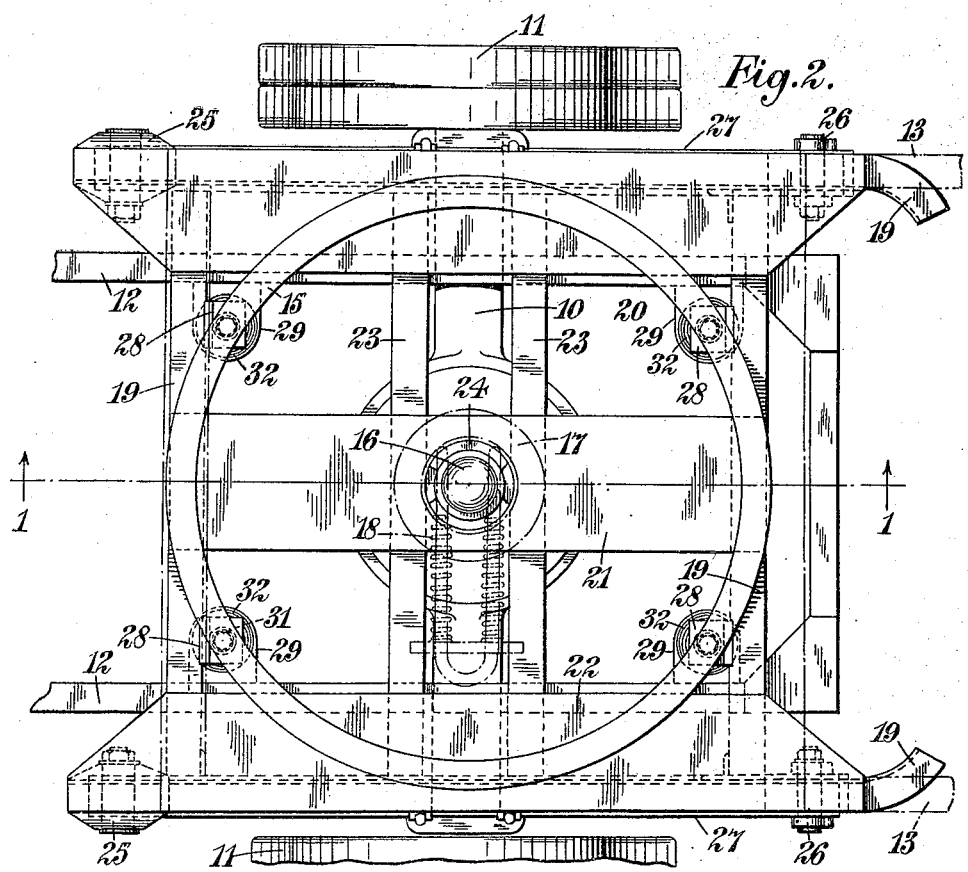

Patented Oct. 28, 1924.

1,513,381

UNITED STATES PATENT OFFICE.

CHARLES KEARNS EDWARDS, OF LONDON, ENGLAND, ASSIGNOR TO THE ASSOCIATED EQUIPMENT COMPANY, LIMITED, OF WESTMINSTER, LONDON, ENGLAND, A BRITISH COMPANY.

TRANSPORT VEHICLE.

Application filed November 9, 1923. Serial No. 673,710.

*To all whom it may concern:*

Be it known that I, CHARLES KEARNS EDWARDS, a subject of the King of England, residing at Chingford, London, England, have invented certain new and useful Improvements in Transport Vehicles, of which the following is a specification.

This invention is for improvements in or relating to transport vehicles of the type in which preferably-separable tractor and trailer parts are employed, the load of the latter being partly supported upon the rear of the former. The invention has for one of its objects to provide a simpler and more efficient construction and arrangement of the tractor and trailer parts than has heretofore been available.

In carrying out the invention the load from the trailer is received by the tractor upon supports at each side of the vehicle which supports reach down to the rear axle of the tractor at points outside the frame of the latter and immediately adjacent the rear wheels thereof. In this way the load is carried on the rear tractor axle at points which apply the minimum amount of bending stress to the axle. The life and general operation of the axle and its co-operating parts is thereby improved.

It is an object of the invention to arrange that the trailer supports include resilient members and are employed to constitute also the connection between the rear end of the tractor chassis and the rear axle of the tractor. In this way unnecessary parts are eliminated and other advantages are also obtained. Thus there may be provided a turntable bearing for connecting the tractor and trailer, which turntable is resiliently supported upon the rear axle of the tractor and itself resiliently supports the rear end of the tractor chassis. In other words the turntable is interposed between a resilient connection on the one hand to the rear axle of the tractor and a resilient connection on the other hand to the rear end of the tractor chassis.

Usually the turntable will be arranged above the rear end of the tractor chassis, and it is a feature of the invention to employ as the connection between the turntable and the rear end of the tractor chassis, four depending resilient links, two situated on each side of the longitudinal centre line of the vehicle with one of each such pair forward and the other rearward of the axis of the turntable.

For a more complete understanding of this and other features of the invention there will now be described, by way of example only and with reference to the accompanying drawings, a preferred constructional form of turntable mounting according to the present invention.

In these drawings:—

Figure 1 is a side elevation of the rear end of a tractor chassis and turntable mounting showing in chain lines the forward end of the trailer. Part of this figure is a sectional view on the line 1—1 of Figure 2.

Figure 2 is a plan of certain of the parts shown in Figure 1, and

Figure 3 is a detail sectional view on a scale larger than that of the other figures.

Like reference numerals indicate like parts throughout the drawings.

In the drawings the rear axle of the tractor is shown at 10 and a corresponding road wheel at 11. The tractor chassis longitudinals are shown at 12 and a portion of the trailer chassis at 13. Underneath the trailer chassis 13 is an annular bearing ring 14 which rests upon a corresponding ring 15 carried upon the turntable. The turntable includes an upright centre pin 16 upon which is received a bush 17 on the trailer, these two parts being secured together when the vehicle parts are coupled, by a spring-controlled U-shaped bolt 18 which can be withdrawn into inoperative position, against the pressure of its springs, when it is desired to uncouple the vehicle parts.

The construction of the turntable itself may be varied according to circumstances. In the form shown, it is composed of girders 19 arranged in plan in the form of a rectangle whereof two of the sides are parallel to the longitudinal centre line of the vehicle. The girders 19 carry on their upper surfaces plates 20, 21 and 22 and are also braced by cross girders 23. At the centre of the rectangle the aforesaid pin 16 is situated, it being received tightly in a bush 24 mounted between the girders 23. The rectangle is supported at each of its corners, by brackets 25 and links 26, upon the ends of leaf-springs 27 secured to the axle 10. These springs 27 are situated outside the chassis members 12 immediately adjacent the wheels 11.

The rectangular turntable framework also carries four angle brackets 28, near its four corners, which brackets each receive the upper end of a depending link. Carried by the rear ends of the longitudinals 12 are other angle brackets 29 one of which reaches under each of the aforesaid brackets 28. The brackets 29 are each perforated at 30 to permit the passage through them of a rod 31 forming part of the aforesaid depending link. Each rod 31 controls a pair of opposed volute springs 32 and 33 which encircle it. The spring 32 bears at one end against the bracket 28 and is received at the other end in a cup 34 upon the upper surface of the bracket 29, while the spring 33 is received at one end in a cup 35 bearing against the under surface of the bracket 29 and at the other end the spring 33 bears against a washer 36 towards the lower end of the rod. The washer 36 has a spherical bearing surface which makes contact with another correspondingly shaped washer 37 carried upon the rod 31, and similarly at the upper end of the rod there is a spherical washer 38 received in a correspondingly shaped bearing washer 39 carried by the bracket 28. The depending links therefore can swing and give readily during travel of the vehicle, and it is preferable to arrange the operative ends of the rods 31 to be adjustable, as shown in the drawings, so as to vary the compression applied to the springs. It will be appreciated that the spherical joints just mentioned will permit the trailer and tractor to rock and tilt relatively to each other as they pass over uneven ground, without disturbing the rotary sliding connection of the two vehicle parts at the situation of the rings 14 and 15.

From the foregoing it will be seen that the chassis longitudinals of the tractor are supported on the axle 10 by way of the depending links, turntable, and finally the springs 27, while the forward end of the trailer is supported upon the axle 10 by way of the turntable and the springs 27.

The arrangement described in the foregoing will be found to provide for the comfort of the driver of the vehicle in that the springing for the tractor will be smooth when the trailer is loaded and its springs flexed into a condition in which they have a low vibration periodicity. Where separate springs are provided for the attachment of the rear end of the tractor chassis to its axle, the springs cannot very well be so chosen as to promote the comfort of the driver.

It is to be understood that the invention is not limited to the precise constructional details hereinbefore set forth, but that changes may be made therein within the scope of the appended claims.

I claim:—

1. A transport vehicle comprising a tractor portion to receive a trailer portion, a turntable bearing for connecting the tractor and trailer, means for resiliently supporting said turntable upon the rear axle of the tractor, and four depending resilient links for resiliently supporting the rear end of the tractor chassis from the turntable, two of said links being situated on each side of the longitudinal centre line of the vehicle with one of each such pairs forward and the other rearward of the axis of the turntable.

2. A transport vehicle comprising a tractor portion to receive a trailer portion, a turntable bearing for connecting the tractor and trailer, means for resiliently supporting said turntable upon the rear axle of the tractor, four depending resilient links for resiliently supporting the rear end of the tractor chassis from the turntable, two of said links being situated on each side of the longitudinal centre line of the vehicle with one of each such pairs forward and the other rearward of the axis of the turntable, and spherical bearings for each end of each of such links to couple the said links to the members they connect.

3. A transport vehicle comprising a tractor portion to receive a trailer portion, a turntable bearing for connecting the tractor and trailer, means for resiliently supporting said turntable upon the rear axle of the tractor, four depending rods for supporting the rear end of the tractor chassis from the turntable, two of said rods being situated on each side of the longitudinal centre line of the vehicle with one of each such pairs forward and the other rearward of the axis of the turntable and a pair of opposed volute springs appropriated to each rod and forming with the latter a resilient link.

In testimony whereof I have signed my name to this specification in the presence of two subscribing witnesses.

CHARLES KEARNS EDWARDS.

Witnesses:
  GEORGE IVEY,
  DAVIS HADLON.